United States Patent
Li et al.

(10) Patent No.: US 10,404,172 B1
(45) Date of Patent: Sep. 3, 2019

(54) TRANSIENT BOOSTER FOR ZERO STATIC LOADLINE SWITCHING REGULATOR

(71) Applicant: Apple Inc., Cupertino, CA (US)

(72) Inventors: Yang Li, Los Altos, CA (US); Adrian K. Ong, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/136,011

(22) Filed: Sep. 19, 2018

Related U.S. Application Data

(60) Provisional application No. 62/692,156, filed on Jun. 29, 2018.

(51) Int. Cl.
| H02M 3/158 | (2006.01) |
| H02M 1/00 | (2006.01) |
| H02M 1/32 | (2007.01) |

(52) U.S. Cl.
CPC .............. *H02M 3/158* (2013.01); *H02M 1/32* (2013.01); *H02M 2001/0009* (2013.01); *H02M 2001/0025* (2013.01); *H02M 2001/0032* (2013.01); *Y02B 70/126* (2013.01)

(58) Field of Classification Search
CPC ........... H02M 3/10; H02M 3/155–158; H02M 3/1563; H02M 3/1582; H02M 3/1584; H02M 3/1588; Y02B 70/126; Y02B 70/1466
See application file for complete search history.

(56) References Cited

U.S. PATENT DOCUMENTS

| 9,450,492 B1* | 9/2016 | Bizjak | H02M 3/156 |
| 2014/0002047 A1* | 1/2014 | Houston | H02M 3/156 323/283 |
| 2016/0087530 A1* | 3/2016 | Gambetta | H02M 3/158 323/271 |
| 2016/0087595 A1* | 3/2016 | Gopalraju | H02M 3/158 323/271 |
| 2016/0248381 A1* | 8/2016 | Yang | H03F 3/193 |
| 2016/0352225 A1* | 12/2016 | Langlinais | H02M 3/157 |

* cited by examiner

*Primary Examiner* — Yemane Mehari
(74) *Attorney, Agent, or Firm* — Blank Rome LLP

(57) ABSTRACT

A zero static loadline switching regulator can include a controller having an integrating outer control loop that receives a first feedback signal corresponding regulator load and a reference signal and generates an intermediate feedback signal therefrom. The control circuit can also include an inner control loop that receives the intermediate feedback signal and a second feedback signal corresponding to a load on the regulator and generates an error signal used to control switching devices of the regulator. The control circuit can also include a transient response circuit configured to boost the error signal, for a predetermined time period after and responsive to a load transient. The error signal may be boosted to an intermediate value between its saturation level and its full scale level. The intermediate value may be predetermined or may be determined responsive to the magnitude of the load transient.

20 Claims, 4 Drawing Sheets

TRANSIENT BOOSTER FOR ZERO STATIC LOADLINE SWITCHING REGULATOR

BACKGROUND

Some zero static loadline switching regulators may implement a dual control loop in which a slower outer control loop implements an integrator based control circuit to compensate for the effect of output loading on the feedback voltage. The output of this outer control loop is provided to a faster main control loop that implements a standard switching regulator controller. In some cases, this arrangement may result in slower than desired response to load transients because of the time required for the integrator to respond to the change in converter loading and output voltage. Thus, it would be desirable in some cases to provide a mechanism for improving the transient response of such control circuits.

SUMMARY

A zero static loadline switching regulator can include an input configured to receive an input DC voltage, an output configured to deliver a regulated output voltage to a load, a switching stage coupled between the input and the output, and a control circuit configured to operate the switching stage to produce the regulated output voltage from the input DC voltage. The control circuit can include an outer control loop configured to receive a first feedback signal corresponding to a load on the regulator and a reference signal and to generate an intermediate feedback signal from a comparison of the first feedback signal to the reference signal. The outer control loop can include an integrator, and the first feedback signal may be a signal corresponding to the regulated output voltage. The control circuit can also include an inner control loop configured to receive the intermediate feedback signal and a second feedback signal corresponding to a load on the regulator and to generate an output signal from a comparison of the intermediate feedback signal to the second feedback signal. The outer control loop may operate more slowly than the inner control loop. The control circuit can also include a controller configured to receive the output signal of the outer control loop and operate the switching stage responsive thereto. The control circuit can still further include a transient response circuit configured to boost an error signal responsive to a load transient.

The transient response circuit may be configured to boost the error signal to an intermediate value between its saturation level and its full scale level. The intermediate value may be predetermined, and may, for example be about one-third of the full scale level of the error signal. Alternatively, the intermediate value may be determined as a function of the magnitude of the load transient. The transient response circuit may configured to boost the error signal for a predetermined time period. The predetermined time period may be between about one-third and one-half of the RC time constant of an integrator in the outer control loop.

A method of operating a zero static loadline switching regulator can include detecting a load transient at an output of the zero static loadline switching regulator, initializing a timer, boosting an error signal in a control loop of the zero static loadline switching regulator, and determining whether the timer has expired. Responsive to a determination that the timer has not expired, the boosting of the error signal may be continued. Responsive to a determination that the timer has expired, boosting of the error signal may be stopped. The timer may be initialized to a value between about one-third and one-half of the RC time constant of the integrator in the outer control loop. The error signal may boosted to an intermediate value between its saturation level and its full scale level. The intermediate value may be predetermined or may be determined as a function of the magnitude of the load transient.

A controller for a zero static loadline switching regulator can include a slower outer control loop configured to receive a first feedback signal corresponding to an output voltage of the regulator and a reference signal and to generate an intermediate feedback signal from a comparison of the first feedback signal to the reference signal. The outer control loop can include an integrator and the intermediate feedback signal may be the integrator output signal. The controller may also include a faster inner control loop configured to receive the integrator output signal and a second feedback signal corresponding to a load on the regulator and to generate an error signal from a comparison of the intermediate feedback signal to the second feedback signal. The controller may further include a switch control and gate drive circuit configured to receive the error signal and operate a switching stage responsive thereto and a transient response circuit. The transient response circuit may be configured to boost the error signal to an intermediate value between its low load saturation level and its full scale level responsive to and for a predetermined time period after a load transient at an output of the zero static loadline switching regulator. The transient response circuit may receive and respond to a feedback signal from the load indicating when the load is exiting a low power state. The load may be a processing unit including one or more processor types selected from the group consisting of a central processing unit (CPU), a graphics processing unit (GPU), and a system on a chip (SoC).

A portable electronic device can include a power source, one or more electrical loads, a switching stage operable to convert a voltage supplied by the power source to a regulated output voltage for delivery to the one or more electrical loads, and a control circuit. The control circuit can include one or more control loops configured to receive at least one feedback signal corresponding to the regulated output voltage and generate control signals for the switching stage. The control circuit can further include a transient response circuit configured to boost an error signal output of at least one of the one or more control loops to an intermediate value between its low load saturation level and its full scale level responsive to and for a predetermined time period after at least one of the one or more electrical loads experiences a load transient.

DETAILED DESCRIPTION

Figure 1:
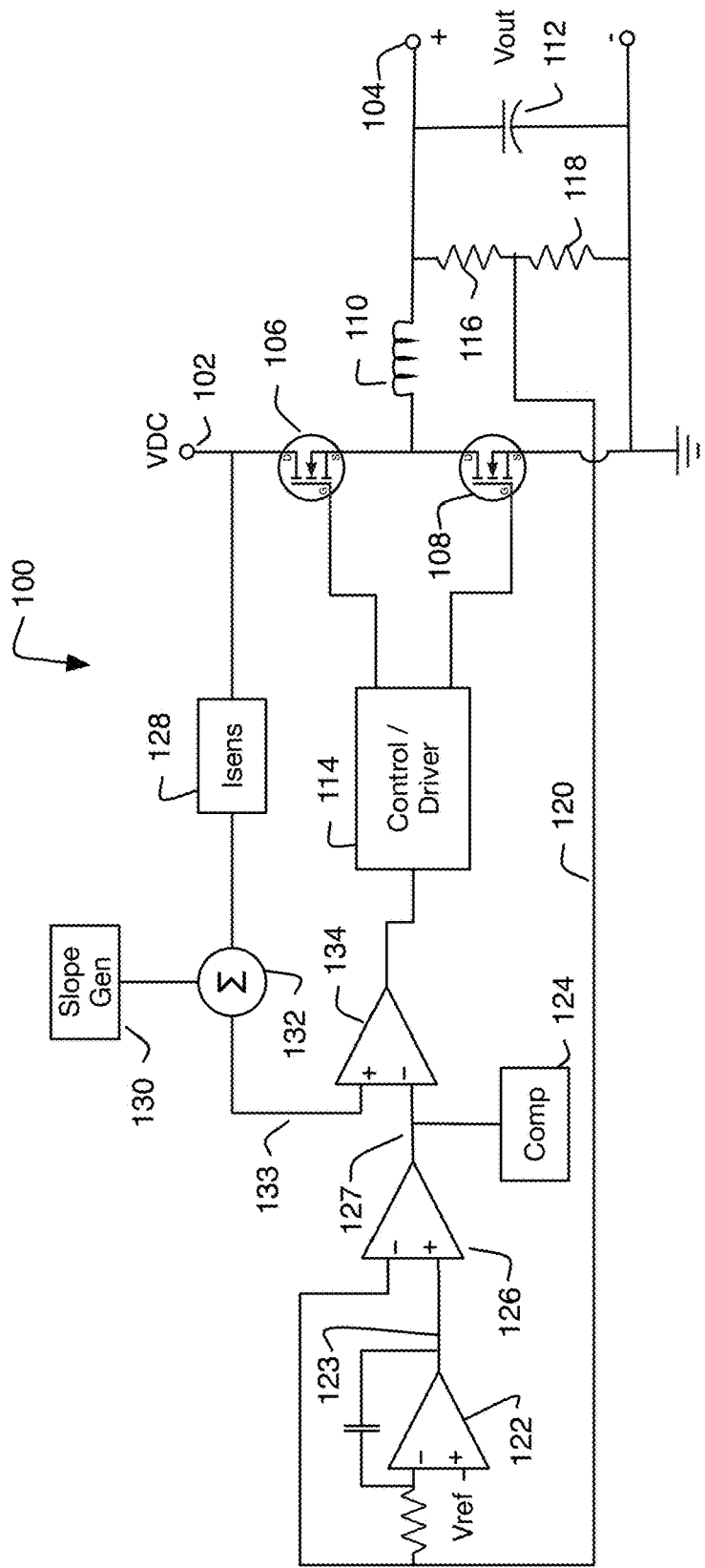
FIG. 1 illustrates a schematic diagram of a zero static loadline switching regulator incorporating a transient response circuit.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

As an initial matter, it is useful to discuss the concept of a zero load line regulator. A zero load line regulator is a regulator in which the feedback voltage of the control circuit (Vref in FIGS. 1 and 2) does not change in response to the output current. Conversely, a finite/non-zero load line regulator is one in which the feedback voltage may change as a response to output load. For example, in an example finite/non-zero load line regulator, the feedback voltage may be at 1V in a low load condition. As the load increases, e.g., to a value of 1 A, the feedback voltage may drop by 3 mV (to a value of 0.997V). As the load further increases, e.g., to a value of 10 A, the feedback voltage may drop 30 mV (to a value of 0.970V). In some embodiments, finite/non-zero load line regulators may have the benefit of relatively higher control system stability. However, this increased stability may come at the expense of transient response. Zero load line regulators can feature improved transient response, although they may be more difficult to stabilize.

In some embodiments, a zero load line regulator may be constructed using an integrator as part of the feedback control loop including the reference voltage. For example, FIG. 1 depicts a high level schematic of a zero static loadline switching regulator 100. Zero static loadline switching regulator 100 receives at its input 102 a DC voltage (VDC) and produces at its output 104 an output voltage Vout. As depicted in FIG. 1, the regulator/converter is a half bridge converter made up of high side switch 106, low side switch 108, output inductor 110, and output capacitor 112. It will be understood that the techniques described herein may be used with any of a variety of converter types, including, without limitation, buck converters, boost converters, buck-boost converters, flyback converters, resonant converters, forward converters, etc. High side switch 106 and low side switch 108 are operated alternately by control/driver circuit 114 to produce the regulated output voltage Vout, appearing across output capacitor 112 at output 104 of the zero static loadline switching regulator 100. Control/driver circuit 114 produces the regulated output voltage Vout responsive to a feedback control loop illustrated on the left side of FIG. 1 and discussed in greater detail below.

The feedback control loop for zero static loadline switching regulator 100 may be understood by beginning with the voltage divider made up of resistors 116 and 118 connected across the output of the regulator. This voltage feedback signal 120 is fed back to the inverting input of integrator 122, which is part of an outer feedback control loop. (Although a voltage divider is used for output voltage sensing in the illustrated embodiment, it will be appreciated that other voltage sensing techniques could also be used.) Integrator 122 is described in greater detail below with respect to FIG. 2A. Integrator 122 receives at its non-inverting input a voltage reference signal Vref, which corresponds to a desired output voltage of the regulator circuit. Integrator 122 produces at its output an intermediate feedback signal 123, also described herein as an integrator output signal, that is an input into an inner control loop as further described below.

Intermediate feedback/integrator output signal 123 may be fed to the non-inverting input of error amplifier 126. Error amplifier 126 forms an inner feedback control loop. Error amplifier 126 receives at its inverting input the same voltage feedback signal 120 as provided to integrator 122. Error amplifier 126 receives at its non-inverting input the output of integrator 122. Error amplifier 126 provides at its output an error signal 127 that is in turn provided to the inverting input of PWM comparator 134. This error signal 127 may be further modified as described below to improve the transient response of zero static loadline switching regulator 100.

PWM comparator 134 receives at its non-inverting input a PWM control signal derived from the load current of zero static loadline switching regulator 100. More specifically, current sensing circuit 128 senses the current delivered from input terminal 102, which corresponds to the load current during the portion of the switching cycle in which main switch 106 is closed. This current signal is added (by summer 132) with the signal generated by slope generator circuit 130 to produce the PWM control signal 133 that is provided to the non-inverting input of PWM comparator 134. PWM comparator 134 thus generates at its output a signal that causes control/driver circuit 114 to increase or decrease the duty cycle of high side switch 106 (and correspondingly decrease or increase the complementary duty cycle of low side switch 108) to maintain output voltage Vout at the desired level.

Figure 2A:
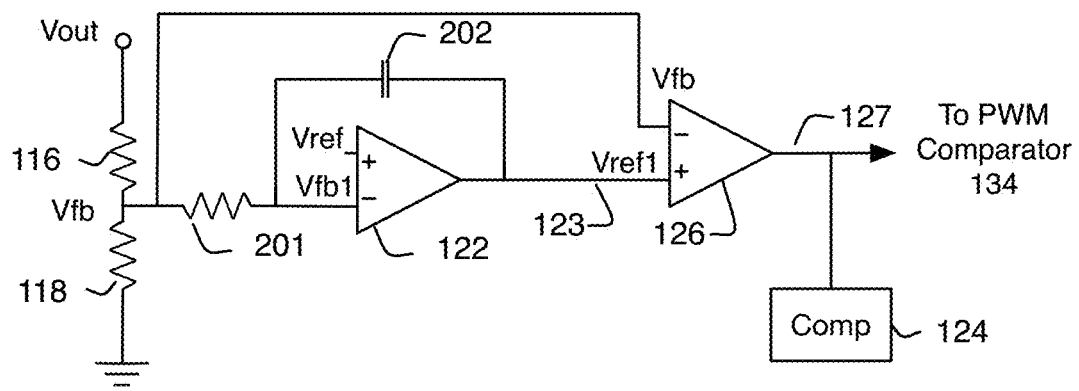
FIG. 2A illustrates a high level schematic control circuit of a zero static loadline switching regulator incorporating a transient response circuit.

FIG. 2A illustrates in greater detail the inner and outer control loops based on integrator 122 and error amplifier 126. More specifically, integrator 122 receives at its inverting input a feedback signal Vfb1 corresponding feedback signal Vfb, which itself corresponds to the output voltage of the zero static loadline switching regulator. Feedback signal Vfb may be derived from the voltage divider formed by resistors 116 and 118, which are connected in series across the output. Integrator 122 receives at its non-inverting input a reference voltage Vref corresponding to the desired output voltage/voltage setpoint of the regulator. Capacitor 202, which is coupled between the inverting input and the output terminals of integrator 122, together with resistor 201, cause integrator 122 to act as an integrator circuit in a manner known to those skilled in the art. More specifically, the RC time constant of capacitor 202 and resistor 201 serve to determine the integration time of the integrator. These values may be selected to form a relatively slow outer control loop as discussed in greater detail below.

The output terminal of integrator 122 produces a reference voltage Vref1, which is coupled to the non-inverting input of error amplifier 126, which forms the faster inner control loop. The inverting input of error amplifier 126 receives the feedback signal Vfb. The error signal 127 output of error amplifier 126 thus provides the error signal that is used by PWM comparator 134 and controller/driver 114 (FIG. 1) to generate the duty cycle and gate drive signals for the converter. As in FIG. 1, error signal 127 may be altered as described below to improve the response of the switching regulator to output transients as described in greater detail below.

As discussed above, zero load line regulator 100 depicted in FIGS. 1 and 2 may use an integrator in the voltage feedback loop, instead of using an output voltage reference directly, to ultimately determine the duty cycle of switching elements 106 and 108. This results in a relatively slower outer loop (including integrator 122) as compared to the relatively faster inner loop that relies on a direct output comparison. Because the output of the integrator/outer loop is fed back to the input of the inner control loop, the inner loop reference is effectively modified to account for any error in the voltage reference signal Vref caused by a change in output load. In other words, the new reference for control/driver circuit 114 tracks error from the outer feedback loop. Although this addresses potential issues associated with a drift in the reference voltage Vref in response to load on the converter, it may present issues with transient response when the load increases from a low load or no load condition.

For example, consider a case in which there is very little load on regulator 100. In such a situation, some of the circuits may be in a turned off or low power state to save power. (This may be especially true in the case of battery operated devices, in which somewhat drastic power saving steps may be employed to maximize battery life.) As a result, the outer loop integrator circuit 122 may have its output pegged to a saturation voltage level corresponding to the outer bound of its range. (The voltage level may be high or low, depending on the design specifics of a given implementation, but in general, integrator output signal 123 will be at one extreme or the other of its output range in a no load or low load condition.) When the load on the switching regulator 100 increases, it will take a significant period of time for the output of integrator 122 to respond to the increase in load. This period of time is a function of the RC time constant determined by the values of resistor 201 and capacitor 202. In any case, because this outer loop is relatively slow, the transient response of the circuit will be delayed by the wind-up time of the integrator, particularly in the case of large load transients (such as those associated with a processor coming out of a sleep or standby condition, as described in greater detail below).

To overcome this delayed transient response associated with the wind-up time of the integrator, a transient response circuit may be configured to force/boost the error signal 127 to a level other than its low load saturation point in response to a load transient. By forcing/boosting the error signal 127 to some value beyond its rest level corresponding to the integrator saturation level, the faster inner control loop (i.e., error amplifier 126) may immediately begin responding to intermediate feedback signal 123, thus improving the transient response. It is not generally necessary to force/boost the error signal 127 to the other end of its range (i.e., its full scale value). In fact, it may be preferable in some embodiments to force/boost error signal 127 to an intermediate value somewhere in the middle of its range. Forcing/boosting error signal 127 to its full scale value may result in the inner control loop substantially overshooting the desired output voltage and may also lead to control stability issues. Additionally, the load step triggering may be less than a full load step, and thus a full scale deflection of error signal 127 would not be warranted.

In some embodiments it may be desirable to boost the error signal 127 to a value that is approximately ⅓ of the full scale range above the saturation voltage. In an exemplary embodiment, assume a 300 mV saturation voltage for a no load condition, and a 1.5V full scale output. In such a case, the transient response circuit, when triggered, may boost the error signal 127 to a value of 700 mV while active. However, it will be appreciated that for a given embodiment other values may be selected, including ¼ of full scale voltage, ½ of full scale voltage, ⅔ of full scale voltage, ¾ of full scale voltage, or other values. In general it is not necessary for the boosting applied by the transient response circuit to overcome the entirety of the transient voltage dip, as any amount of preload will be beneficial in improving the transient response.

In addition to limiting the magnitude of forcing/boosting that is applied to error signal 127, it may also be desirable to provide a time limit on the boosting of error signal 127. More particularly, once the regulator has resumed stabilized operation at a power level higher than the no load/low load level, it may be preferable to have the control circuit resume normal operation. This may be achieved by imposing a time limit on the forcing/boosting function. The specific time limit may be determined by the system designer, taking into account the particulars of a given implementation. In some embodiments, it may be desirable for the time limit of the boosting function to be slightly less than the time expected for the regulator and control circuit to stabilize in response to a given load step. In some cases, this given load step may be a full load step or may be a most frequently expected load step, which could be less than a full load step.

In some embodiments it may be desirable to boost the error signal 127 for a time period that is in a range of about ⅓ to ½ of the RC time constant of the integrator circuit. In an exemplary embodiment, an integrator circuit like that illustrated in FIGS. 1 and 2 may have an integration time of about 100 microseconds. Thus, the error signal 127 may be boosted for a time period of about 30 microseconds to about 50 microseconds. (Other durations may be desirable in a given embodiment.) In any case, this boost signal time will still be quite long/slow with respect to the inner control loop. In some embodiments, the inner loop may have an operating bandwidth on the order of 200 kHz, while the outer loop may have an operating bandwidth of about 40 kHz. As with the magnitude of the error signal boosting, it is not necessary that the duration of the error signal boosting extend for the entire duration of the transient, because the faster inner loop will also be responding to the transient, and the integrator itself will also begin to catch up.

Figure 2B:
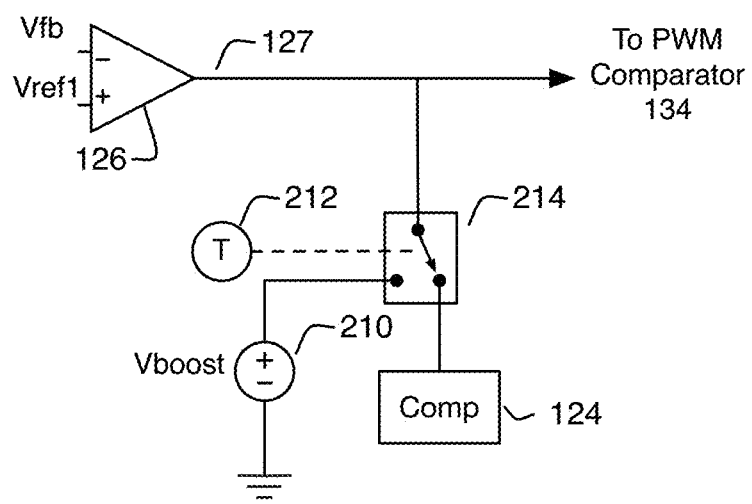
FIG. 2B illustrates a block diagram of a transient response circuit.

FIG. 2B illustrates a block diagram of a transient response circuit for boosting error signal 127 as described above. Transient response circuit includes a voltage source 210 providing a boost voltage Vboost, which may be selected or determined as described above. In response to a detected transient condition, timer 212 may operate switch 214 to temporarily couple voltage source 210 to error signal 127 (thus forcing it to a value of Vboost). Timer 212 may operate for a boost signal time selected as described above. Upon expiration of the boost signal time, switch 214 may be toggled again to recouple the normal compensation circuitry 124 to error signal 127.

Figure 3:
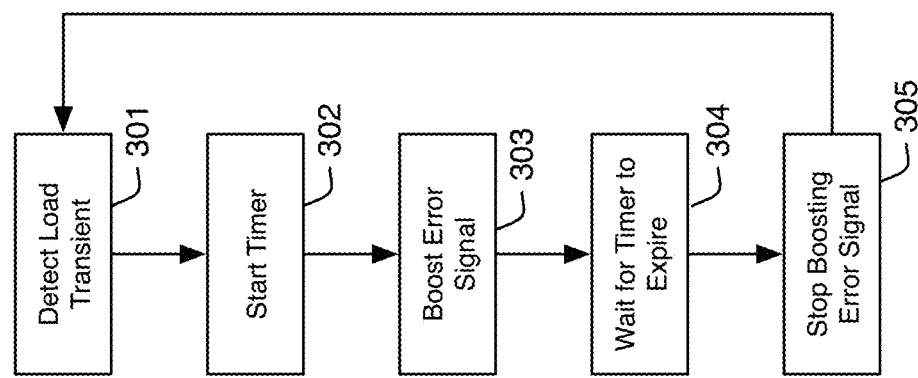
FIG. 3 illustrates a flow chart of a method of operating a transient response circuit in a zero static loadline switching regulator controller.

FIG. 3 illustrates a flow chart depicting operation of the error signal boosting described above. In block 301, a load transient is detected. In some embodiments, this load transient may be associated with a significant increase in load on the regulator. This significant increase may be associated with an increase in activity associated with a device powered by the regulator. In some embodiments, the increase in load may be associated with the device coming out of a standby mode into an active mode. For example, in some embodiments, the regulator may power a processor, such as a CPU, a GPU, or a system on a chip (SoC) implementing multiple processing components, or the regulator may power other intermittently operated electronics such as radios for wireless networking (including Bluetooth, WiFi, cellular data, etc.), displays (such as LCD or OLED based displays that are turned off when not in use to conserve power), or any other type of electronic load that can experience significant changes in power consumption during operation. In some embodiments, the regulator may be configured to power multiple such components.

Once a load transient is detected, a timer is initialized in block 302, and circuitry begins boosting the error signal 127. The error signal 127 may be boosted to any value greater than the rest level corresponding to the no load/low load saturation value of the integrator output. In some embodiments, it may be desirable for the boost value to be a preselected value. The preselected value may be a single value or may be selected from among a plurality of values at least partially in response to the magnitude of the detected load transient. In an case, the transient response circuit then checks to see whether the timer has expired. As described above, the timer value may be selected so that the boosting function will terminate in an amount of time slightly less than the time expected for the regulator and control circuit to settle in response to the transient. As with the magnitude of the boost applied to the error signal, it may be desirable in some embodiments for the timer value to be selected based on the magnitude of the load transient. In block 304, while the timer is counting, the system continues boosting the error signal (block 303). Once the timer has expired (block 304), boosting of the error signal is stopped (block 305) and the system waits for another load transient to be detected (block 301).

Figure 4:
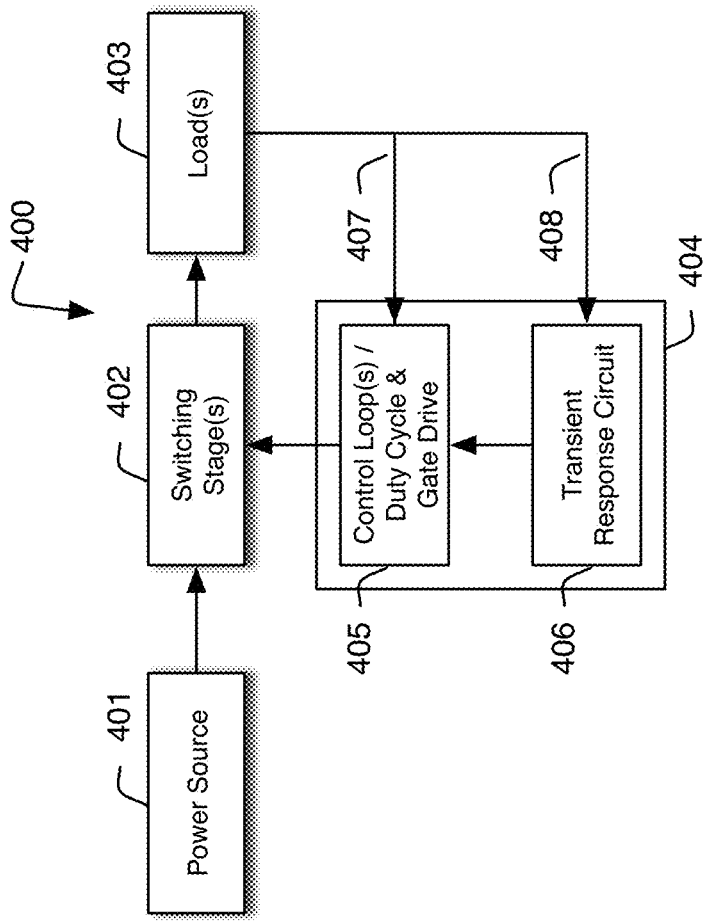
FIG. 4 illustrates a block diagram of an electronic system incorporating a zero static loadline switching regulator incorporating an integrator output boost compensation circuit.

FIG. 4 is a block diagram illustrating a system 400 incorporating a zero load line switching regulator as described herein. System 400 may be implemented as a portable electronic device, such as a mobile telephone, tablet computer, laptop computer, smart watch, music player, etc. System 400 may include a power source 401. In the case of a portable electronic device, power source 401 may be an electrochemical cell or battery of electrochemical cells, such as a lithium ion or other battery technology (collectively referred to herein as a "battery"). Power source 401 may supply power to a load 403 through switching stage 402. As described above, load 403 may be a processor, such as a CPU, a GPU, or a system on a chip (SoC) implementing multiple processing components, or the regulator may power other intermittently operated electronics such as radios for wireless networking (including Bluetooth, WiFi, cellular data, etc.), displays (such as LCD or OLED based displays that are turned off when not in use to conserve power), or any other type of electronic load. Switching stage 402 may be any type of switching converter, including, without limitation, buck converters, boost converters, buck-boost converters, flyback converters, resonant converters, forward converters, etc. Switching stage 402 may be controlled by control circuit 404, which may include control loop(s) and duty cycle and gate drive controller 405 augmented by compensation circuit 406.

Feedback signal 407 may provide feedback of output voltage or other indication of load on the converter to the control loop(s) and duty cycle and gate drive circuitry so that the control circuit 404 can operate switching stage 402 to maintain the output voltage supplied to load 403 in regulation. Additionally, feedback signal 408 may be supplied by the load to controller 404 and, for example, transient response circuit 406 to provide an indication of when the load (or loads) is entering a no power/low power state, such as a standby mode. Feedback signal 408 may also indicate to the control circuit and, for example, transient response circuit 406 when the load (or loads) are exiting a no power/low power state, such as an active mode. Control circuit 404 may infer from this feedback signal when a load transient is occurring and may operate transient response circuit 406 to boost an error signal 127 as described above to improve the transient response of the power converter. In some embodiments, feedback signal 408 may not be provided from load 403 to transient response circuit 406, and the controller 404 may rely on its own internal measurements and/or its own internal sleep/standby status as a trigger for transient response circuit 406.

Figure 5:
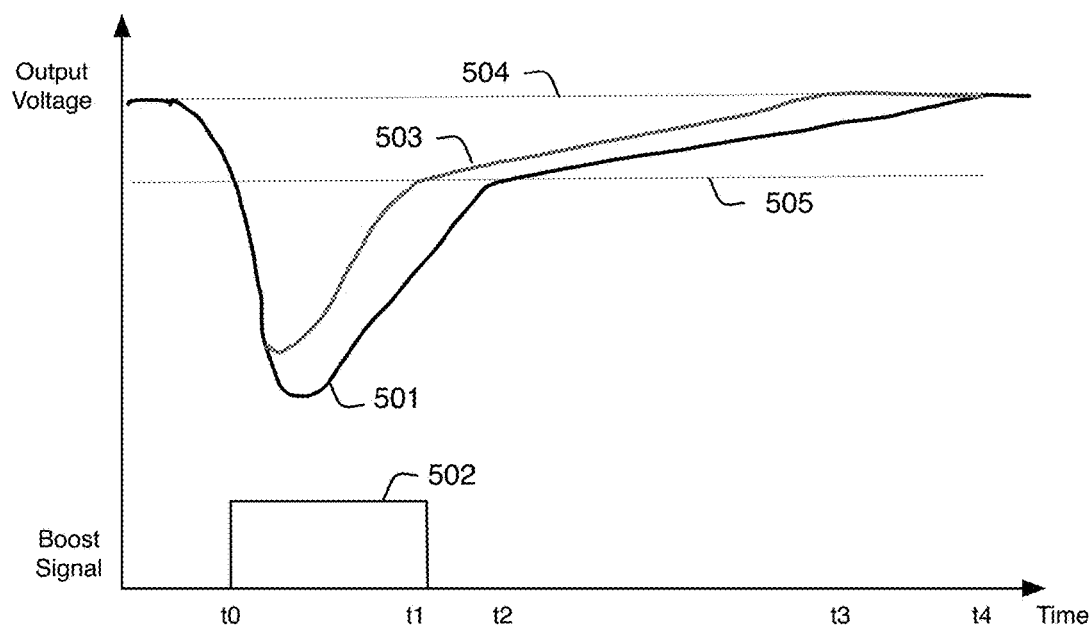
FIG. 5 illustrates various signals associated with a load transient in a zero static loadline switching regulator incorporating a transient response circuit.

FIG. 5 illustrates exemplary response curves for a system implementing the techniques described herein. Curve 501 represents the output voltage response for a zero load line converter that does not implement the compensation circuit discussed herein. In response to a transient load increase occurring at time t0, the voltage dips substantially before recovering to the nominal output voltage 504 at time t4. Curve 503 represents the output voltage response for the same converter implementing the transient response circuit discussed herein. Boost signal curve 502 indicates the boosting that is applied to the error signal 127 as discussed above. More specifically, boost signal 502 is active from time t0 until time t1, which corresponds the timer discussed above with respect to FIG. 3. (It will be appreciated that t1−t0 corresponds to the time delay discussed above.) As a result of the boosting operation, output voltage 503 does not dip to the same degree as unboosted output voltage 501. Additionally, output voltage 503 recovers more quickly, recovering to the desired output voltage at time t3, and spends less time below low voltage threshold 505.

Described above are various features and embodiments relating to zero static loadline switching regulators. Such regulators may be used in a variety of applications, but may be particular advantageous when used in conjunction with portable electronic devices such as mobile telephones, smart phones, tablet computers, laptop computers, media players, and the like, as well as the peripherals associated therewith. Such associated peripherals can include input devices (such as keyboards, mice, touchpads, tablets, and the like), output devices (such as headphones or speakers), storage devices, or any other peripheral.

Additionally, although numerous specific features and various embodiments have been described, it is to be understood that, unless otherwise noted as being mutually exclusive, the various features and embodiments may be combined in any of the various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A zero static loadline switching regulator comprising:
   an input configured to receive an input DC voltage;
   an output configured to deliver a regulated output voltage to a load;
   a switching stage coupled between the input and the output; and
   a control circuit configured to operate the switching stage to produce the regulated output voltage from the input DC voltage, wherein the control circuit comprises:
      an outer control loop configured to receive a first feedback signal corresponding to a load on the regulator and a reference signal and to generate an intermediate feedback signal from a comparison of the first feedback signal to the reference signal;
      an inner control loop configured to receive the intermediate feedback signal and a second feedback signal corresponding to a load on the regulator and to generate an error signal from a comparison of the intermediate feedback signal to the second feedback signal;
      a controller configured to receive the error signal and operate the switching stage responsive thereto; and
      a transient response circuit configured to boost the error signal responsive to a load transient.

2. The zero static loadline switching regulator of claim 1 wherein the outer control loop includes an integrator.

3. The zero static loadline switching regulator of claim 1 wherein the first feedback signal is a signal corresponding to the regulated output voltage.

4. The zero static loadline switching regulator of claim 1 wherein the outer control loop operates more slowly than the inner control loop.

5. The zero static loadline switching regulator of claim 1 wherein the transient response circuit is configured to boost the error signal to an intermediate value between its saturation level and its full scale level.

6. The zero static loadline switching regulator of claim 5 wherein the intermediate value is predetermined.

7. The zero static loadline switching regulator of claim 6 wherein the intermediate value is about one-third of the full scale level of the intermediate feedback signal.

8. The zero static loadline switching regulator of claim 5 wherein the intermediate value is determined as a function of the magnitude of the load transient.

9. The zero static loadline switching regulator of claim 1 wherein the transient response circuit is configured to boost the intermediate feedback signal for a predetermined time period.

10. The zero static loadline switching regulator of claim 9 wherein the predetermined time period is between about one-third and one-half of the RC time constant of an integrator in the outer control loop.

11. A method of operating a zero static loadline switching regulator, the method comprising:
    detecting a load transient at an output of the zero static loadline switching regulator;
    initializing a timer;
    boosting an error signal in a control loop of the zero static loadline switching regulator;
    determining whether the timer has expired; and
       responsive to a determination that the timer has not expired, continuing the boosting of the error signal; or
       responsive to a determination that the timer has expired, stopping the boosting of the error signal.

12. The method of claim 1 wherein the timer is initialized to a value between about one-third and one-half of the RC time constant of the integrator in the outer control loop.

13. The method of claim 11 wherein the error signal is boosted to an intermediate value between its saturation level and its full scale level.

14. The method of claim 13 wherein the intermediate value is predetermined.

15. The method of claim 14 wherein the intermediate value is about one-third of the full scale level of the error signal.

16. The method of claim 13 wherein the intermediate value is determined as a function of the magnitude of the load transient.

17. A controller for a zero static loadline switching regulator, the controller comprising:
    a slower outer control loop configured to receive a first feedback signal corresponding to an output voltage of the regulator and a reference signal and to generate an intermediate feedback signal from a comparison of the first feedback signal to the reference signal, wherein the outer control loop comprises an integrator and the intermediate feedback signal is an integrator output signal;
    a faster inner control loop configured to receive the integrator output signal and a second feedback signal corresponding to a load on the regulator and to generate an error signal from a comparison of the intermediate feedback signal to the second feedback signal;
    a circuit configured to receive the error signal and operate a switching stage responsive thereto; and
    a transient response circuit configured to boost the error signal to an intermediate value between its low load saturation level and its full scale level responsive to and for a predetermined time period after a load transient at an output of the zero static loadline switching regulator.

18. The controller of claim 17 wherein the transient response circuit receives a feedback signal from the load indicating when the load is exiting a low power state.

19. The controller of claim 18 wherein the load is a processing unit including one or more processor types selected from the group consisting of a central processing unit (CPU), a graphics processing unit (GPU), and a system on a chip (SoC).

20. A portable electronic device comprising:
    a power source;
    one or more electrical loads;
    a switching stage operable to convert a voltage supplied by the power source to a regulated output voltage for delivery to the one or more electrical loads; and
    a control circuit, the control circuit including one or more control loops configured to receive at least one feedback signal corresponding to the regulated output voltage and to generate control signals for the switching stage, wherein the control circuit further comprises a transient response circuit configured to boost an output of at least one of the one or more control loops to an intermediate value between its low load saturation level and its full scale level responsive to and for a predetermined time period after at least one of the one or more electrical loads experiences a load transient.

* * * * *